3,813,455
PROCESS FOR INCREASING MOLECULAR
WEIGHT OF LIVE POLYMERS
William M. Saltman and Melvin Auerbach, Akron, Ohio, assignors to The Goodyear Tire & Rubber Company, Akron, Ohio
No Drawing. Filed Oct. 2, 1972, Ser. No. 294,413
Int. Cl. C08d 5/04
U.S. Cl. 260—879        9 Claims

ABSTRACT OF THE DISCLOSURE

A method of increasing the molecular weight and the molecular weight distribution of homopolymers of conjugated diolefins and aromatic olefins and copolymers of conjugated diolefins and/or aromatic olefins which have been polymerized by means of lithium based catalysts in which each polymer chain contains at least one terminal lithium group which comprises reacting such polymers with a hexahalogenated cyclopentadiene at temperatures from about 0° C. to about 100° C. whereby the polymer chains are extended.

---

This invention is directed to a method for the modification of polymers prepared by means of a lithium based catalyst, wherein said polymers are homopolymers derived from conjugated dienes or aromatic olefins and copolymers of conjugated dienes and/or aromatic olefins. More specifically, it relates to a method of extending the polymer chain of lithium catalyzed polymers and copolymers of aromatic olefins, conjugated diolefins or mixtures thereof by use of hexa-halogenated cyclopentadienes.

Among the inherent characteristics of hydrocarbon lithium initiated polymerizations are linearity of chains and a narrow molecular weight distribution. Those skilled in the art know that these characteristics result in two specific problems in the solution polymers produced with such initiators, one being high cold flow, the other being poor processing.

The term "cold flow" is used to describe the property of a polymer whereby it has a tendency to deform upon standing rather than to retain its original baled shape. A polymer having a high degree of "cold flow" behaves somewhat similar to a very viscous liquid. This phenomenon may result in loss of material, contamination, sticking together of individual bales of polymer, and other handling and storage difficulties.

By the term "poor processing" is meant that the polymers are more difficult to process in standard rubber equipment, such as Banbury mixers, mills and tubers, compared to natural rubber and emulsion polymerized SBR.

Vulcanizates of such polymers may be characterized by excellent physical properties, including high resiliency, low hysteresis, excellent resistance to abrasion, low heat build-up and excellent flexibility in comparison with the known commercial synthetic polymers. One way to eliminate both of the aforementioned problems seems to be to broaden the molecular weight distribution of the polymer. The prior art shows many attempts to alter the molecular weight distribution with the objective of overcoming these deficiencies. The technique of chain extending the polymer molecules in a post polymerization reaction has been one of the procedures used to broaden the molecular weight distribution. However, many of these prior art chain extending reactions have required large amounts of the chain extending agent, or have required long times for the chain extending reaction, or required high temperatures, or additional amounts of the polymer initiator. Also, in some prior art methods of chain extending, side reactions occur causing the formation of gel.

It is, therefore, an object of this invention to provide a wider molecular weight distribution with a rapid chain extending reaction conducted at ambient temperatures. It is also an object to produce a polymer with no gel formed in a side reaction and to use only small amounts of the coupling agent.

Therefore, according to the invention there is provided a method of increasing the molecular weight distribution of homopolymers of conjugated diolefins and aromatic olefins and copolymers of conjugated diolefins and/or aromatic olefins which have been polymerized by means of lithium based catalysts in which each polymer chain contains at least one terminal lithium group which comprises reacting such polymers with a hexahalogenated cyclopentadiene at temperatures from about 0° C. to about 100° C. whereby the polymer chains are extended.

The starting polymers are derived in substantial part from conjugated diene monomers, aromatic olefinic monomers and mixtures thereof. The polymers are produced by solution polymerization techniques carried out in the absence of air and moisture.

Some representative examples of conjugated diene monomers which can be polymerized and the resulting polymers extended by the techniques used in this invention are 1,3-butadiene, isoprene, 1,3-pentadiene, 2,3-dimethyl-1,3-butadiene, 2 - ethyl-1,3-pentadiene, 3-methyl-1,3-pentadiene, 1,3-hexadiene, 2 - methyl-1,3-hexadiene and other conjugated diolefins containing up to eight carbon atoms.

Some representative examples of aromatic olefinic monomers which can be polymerized and the polymers extended by the techniques used in this invention are styrene, vinyl pyridine, and methacrylonitrile, α-methyl styrene, vinyl toluene, and vinyl naphthalene.

Some representative examples of monomers which can be copolymerized and the resulting polymers extended by the techniques used in this invention are butadiene/styrene, butadiene/vinyl toluene, isoprene/styrene, isoprene/butadiene and 1,3-pentadiene/styrene.

The polymerization reaction is usually carried out in an inert solvent such as a hydrocarbon, preferably hexane, heptane or benzene, or a mixture of solvents. The chain extension reaction employed in this invention can also be carried out in the solution in which the living polymer is formed. By the term "living polymer" is meant that the polymerization has no termination or transfer reactions so that the polymer chains have lithium atoms attached to the chain end even when all the monomer is consumed. If additional monomer is added the polymerization will continue with the new monomer adding on to the *already existing* chains until it also is consumed.

The polymerization reactions are usually carried out at temperatures from about 0° C. to about 100° C. The polymerization reaction is preferably carried out between 30° C. and 80° C.

The chain extending reaction is carried out at temperatures from about 0° C. to about 80° C. and preferably from about 0° C. to about 50° C.

The chain extending agents which are useful in this invention are selected from the group consisting of 1,2,3,4,5,5 - hexachlorocyclopentadiene, 1,2,3,4,5,5-hexabromocyclopentadiene and 1,2,3,4,5,5-hexafluorocyclopentadiene.

The polymerization initiator may be any of the known hydrocarbon lithium and dilithium initiators such as methyl lithium, ethyl lithium, butyl lithium, amyl lithium, hexyl lithium, 2-ethyl hexyl lithium, allyl lithium, phenyl lithium, tolyl lithium, pentamethylene dilithium and other known hydrocarbyl lithium and dilithium initiators.

The amount of catalyst used in the practice of this invention cannot be specifically set down since the amount of catalyst used depends on the molecular weight of polymer desired. What can be said is that a catalytic amount is necessary for polymerization. As an illustrative example only to show how the catalytic level may vary the molecular weight, if for example, 100 grams of monomer were to be polymerized to 100 percent conversion to a molecular weight of about 25,000, a catalyst level of about $4 \times 10^{-3}$ moles of n-butyl lithium would be employed. To polymerize the same 100 grams of monomer to 100 percent conversion to a molecular weight of 500,000, about $2 \times 10^{-4}$ moles of n-butyl lithium would be employed. Thus, it can be shown that those skilled in the art could adjust the catalyst level to get any desired molecular weight.

The rubbery products of higher molecular weight produced by this chain extending process are useful for the purposes for which the conventionally prepared polymers have been employed, as in the production of vulcanized rubbery products, but are better in storage and processing.

It is well known that chain extending agents such as 1,2,3,4,5,5-hexachlorocyclopentadiene (HEX) have only two active chlorines and that the four vinyl chlorines are very unreactive. In spite of this, the Mooney increase resulting from addition of equivalent amounts of HEX is much greater than from the addition of similar amounts of dichlorobutene, carbon tetrachloride, or halogenated aromatics. Mooney is measured by ASTM D-1646. This unexpectedly large increase in Mooney is accompanied by an increase in the Mooney/DSV ratio. By DSV is meant dilute solution viscosity. One of the advantages of the chain extending agents used in this invention is the small amount necessary to accomplish the desired increase in molecular weight and the fast reaction of the chain extending agent at ambient temperatures.

The living molecules of polymers made with hydrocarbon monolithium catalysts contain only one lithium metal terminal group. The chain extending agent reacts with the single lithium metal terminal group of one polymer chain and the other part of the coupling agent reacts with the lithium metal terminal group of another polymer chain to give a higher molecular weight and a broader molecular weight distribution of the overall polymer mixture, depending on level of usage of the coupling agent.

Similarly, if dilithium hydrocarbon catalysts are employed in this invention, the polymer chains will be terminated by two lithium atoms, one on each end of the polymer chains. If a chain extending agent is used, the polymer chains could theoretically join into one long chain with the chain extending agent connecting all the determined polymer chains.

With the addition of the chain extending agent, no additional catalyst is needed for the extending reaction, and no additional heating is necessary to promote the reaction rate.

The amount of chain extending agent used is calculated according to the amount of polymerization initiator used to make the polymer. Theoretically, a chain extending agent which has two reactive sites should be able to couple two singly lithium metal terminated groups.

However, impurities and the desired amount of chain extension determine how much chain extending agent should be used because of the loss of some of the agent. Therefore, the amount of chain extending agent cannot be sepcifically set down. Theoretically, in an ideal system, if there were 100 chains of a polymer having molecular weights of 100, than 50 chain extending agents would double the molecular weight without broadening the molecular weight distribution. However, if 25 chain extending agents were added to the same system, 50 of the polymer chains would be coupled, thus doubling their molecular weight and leaving the other 50 polymer chains the same. This would have the effect of broadening the molecular weight distribution as well as raising the molecular weight.

It appears theoretically, therefore, that an amount of chain extending agent equivalent to one-half the number of polymer chains or in excess thereof would raise the molecular weight, whereas adding an amount less than enough to chain extend all the polymers would broaden the molecular weight distribution as well. The amount used by one skilled in the art would depend on how much chain extending is desired, the purity of one's system, and the control of other factors which determine the amount of loss of the chain-extending agent.

It has been found that prior art coupling agents required excessively large amounts of the coupling agent to gain a desired increase in molecular weight. It could be that some of the prior art coupling agent is rendered useless by other side reactions before completing its job. However, with the chain extending agents used in this invention, it has been found that large amounts or excess extending agent are not necessary to achieve a desired increase and that the chain extending reaction is rapid.

The invention is further illustrated by reference to the following examples which are intended to be representative rather than restrictive of the scope.

EXAMPLE I

Styrene/butadiene polymer was prepared using solution polymerization techniques by polymerizing 20 grams of monomer (40/60 percent by weight mixture of butadiene/styrene) in a total of 85 milliliters of benzene solution at 50° C. for 65 minutes using $1.0 \times 10^{-4}$ moles of n-butyllithium (n-BuLi) as initiator. At this time the "living" polymer cement was treated with various amounts of the chain extending agent and allowed to stand at 20° C., for the times stated in Table 1. This example shows how much the molecular weight (DSV) can be increased without creating gel.

TABLE 1
Effect of 1,2,3,4,5,5-hexachlorocyclopentadiene (HEX) on DSV

| Mole HEX$\times 10^{-4}$ | Chain extending reaction time, min. | DSV | Percent DSV increase | Gel |
|---|---|---|---|---|
|  | None | 1.03 |  | 3.2 |
| .1 | 60 | 1.26 | 22.3 | 4.1 |
| .2 | 60 | 1.57 | 52.2 | 5.0 |
| .3 | 60 | 1.66 | 61.1 | 3.0 |
| .5 | 60 | 1.58 | 53.3 | 2.9 |
| .75 | 60 | 1.73 | 67.9 | 4.0 |
| 1.0 | 60 | 1.80 | 74.8 | 3.5 |

EXAMPLE II

Polybutadiene polymer was prepared using solution polymerization techniques by polymerizing 10 grams of butadiene monomer in a total of 85 ml. of benzene solution at 40° C. for 16 hours to 100 precent conversion using $2 \times 10^{-4}$ mole of n-butyllithium (n-BuLi) as initiator. After polymerization was completed with live polymer cement was treated with various amounts of chain extender (HEX) and allowed to stand at room temperature for the times stated in Table 2. This example shows the swiftness of the reaction with HEX.

TABLE 2
Effect of 1,2,3,4,5,5-hexachlorocyclopentadiene (HEX) on DSV

| Mole HEX$\times 10^{-4}$ | Chain extending reaction time, min. | DSV | Percent DSV increase | Gel |
|---|---|---|---|---|
|  |  | 1.01 |  | 3.2 |
| .1 | 5 | 1.17 | 15.9 | 3.4 |
| .2 | 5 | 1.26 | 24.7 | 3.1 |
| .3 | 5 | 1.36 | 34.7 | 2.8 |
| .4 | 5 | 1.32 | 30.7 | 3.4 |
| .5 | 5 | 1.30 | 28.7 | 3.2 |
| .625 | 5 | 1.30 | 29.7 | 3.4 |
| .3 | 1 | 1.35 | 33.7 | 2.8 |
| .3 | 5 | 1.36 | 34.7 | 2.8 |

EXAMPLE III

The same procedure was used as that in Example II except that isoprene was polymerized instead of butadiene.

TABLE 3

Effect of 1,2,3,4,5,5-hexachlorocyclopentadiene (HEX) on DSV

| Mole HEX×10⁻⁴ | Chain extending reaction time, min. | DSV | Percent DSV increase | Gel |
|---|---|---|---|---|
|  |  | 1.09 |  | 3.0 |
| .1 | 5 | 1.25 | 14.7 | 2.9 |
| .2 | 5 | 1.43 | 29.3 | 2.9 |
| .3 | 5 | 1.84 | 67.1 | 3.9 |
| .4 | 5 | 1.50 | 37.7 | 2.2 |
| .5 | 5 | 1.62 | 46.8 | 3.2 |
| .625 | 5 | 1.39 | 27.6 | 3.4 |

EXAMPLE IV

The same procedure was used as that in Example II except styrene was polymerized instead of butadiene and the polymerization was conducted at room temperature for 24 hours.

TABLE 4

Effect of 1,2,3,4,5,5-hexachlorocyclopentadiene (HEX) on DSV

| Mole HEX×10⁻⁴ | Chain extending reaction time, min. | DSV | Percent DSV increase | Gel |
|---|---|---|---|---|
|  |  | 0.26 |  | 8.6 |
| .1 | 5 | 0.37 | 42.3 | 7.1 |
| .2 | 5 | 0.42 | 61.6 | 7.0 |
| .3 | 5 | 0.45 | 73.0 | 6.5 |
| .4 | 5 | 0.40 | 53.9 | 6.1 |
| .5 | 5 | 0.40 | 53.9 | 7.1 |
| .6 | 5 | 0.40 | 53.9 | 7.1 |

EXAMPLE V

The same procedure was used as that in Example II except that vinyl pyridine was polymerized instead of butadiene.

TABLE 5

Effect of 1,2,3,4,5,5-hexachlorocyclopentadiene (HEX) on DSV

| Mole HEX×10⁻⁴ | Chain extending reaction time, min. | DSV | Percent DSV increase | Gel |
|---|---|---|---|---|
|  |  | 0.31 |  | 13.6 |
| .1 | 5 | 0.34 | 9.7 | 10.6 |
| .2 | 5 | 0.34 | 9.7 | 11.2 |
| .3 | 5 | 0.36 | 16.1 | 12.5 |
| .4 | 5 | 0.35 | 12.9 | 11.8 |
| .5 | 5 | 0.44 | 42.0 | 10.9 |
| .6 | 5 | 0.44 | 42.0 | 12.6 |
| .7 | 5 | 0.38 | 22.6 | 12.6 |

EXAMPLE VI

An AB type block polymer was prepared using styrene and butadiene as monomers and then chain extended with various amounts of an extending agent.

The A portion of the block represents the polystyrene portion of the block polymer and the B portion of the block represents the polybutadiene portion of the block polymer.

The styrene block was prepared by utilizing solution techniques to polymerize 75 grams of styrene with $5.08 \times 10^{-3}$ mole of n-butyllithium as initiator in a total of 305 milliliters of benzene solution at room temperature for 16 hours to 100 percent conversion.

To 16 milliliters of this polystyrene lithium polymer was added 7.02 grams of butadiene in a total of 65 milliliters of benzene solution and polymerized at 50° C. for 24 hours to 100 percent conversion. This results in formation of a di-block styrene-butadiene polymer.

The live AB block polymer was treated with various amounts of the chain extending agent 1,2,3,4,5,5 - hexachlorocyclopentadiene and allowed to stand at room temperature for the times stated in Table VI. The dilute solution viscosity (DSV) was measured to indicate the increase in styrene-butadiene-styrene block formation and molecular weight increase.

TABLE VI

Effect of 1,2,3,4,5,5-hexachlorocyclopentadiene (HEX) on DSV

| Mole HEX×10⁻⁴ | Chain extending reaction time, min. | DSV | Percent DSV increase | Gel |
|---|---|---|---|---|
|  |  | 0.42 |  | 2.0 |
| .1 | 5 | 0.54 | 28.6 | 3.5 |
| .2 | 5 | 0.68 | 61.4 | 3.3 |
| .3 | 5 | 0.62 | 47.7 | 2.8 |
| .4 | 5 | 0.65 | 54.7 | 3.6 |
| .5 | 5 | 0.70 | 66.6 | 2.7 |
| .6 | 5 | 0.66 | 57.1 | 2.5 |

EXAMPLE VII

The procedure used in this example are the same as those used in Example I except that several different chain extending agents are compared using various amounts of the agents. This example shows the much greater effectiveness of HEX.

TABLE 7

| Chain extending agent | Moles of agent ×10⁻⁴ | DSV | Percent DSV increase |
|---|---|---|---|
| HEX [1] |  | 1.03 |  |
|  | .1 | 1.26 | 22.3 |
|  | .2 | 1.57 | 52.2 |
|  | 1.0 | 1.80 | 74.8 |
| CCl₄ [2] |  | 1.19 |  |
|  | .05 | 1.31 | 11.0 |
|  | .1 | 1.44 | 21.0 |
|  | .5 | 1.51 | 26.8 |
| DCB [3] |  | 1.02 |  |
|  | .1 | 1.07 | 4.9 |
|  | .25 | 1.09 | 6.9 |
|  | 1.0 | 1.14 | 11.8 |
| DBE [4] |  | 1.04 |  |
|  | .1 | 1.19 | 13.4 |
|  | .25 | 1.27 | 22.1 |
|  | 1.0 | 1.56 | 50.0 |

[1] 1,2,3,4,5,5-hexachlorocyclopentadiene.
[2] Carbon tetrachloride.
[3] 1,4-dichlorobutene-2.
[4] 1,2-dibromoethane.

While certain representative embodiments and details have been shown for the purpose of illustrating the invention, it will be apparent to those skilled in this art that various changes and modifications may be made therein without departing from the spirit or scope of the invention.

What we claim is:

1. The process of increasing the molecular weight and its distribution of homopolymers of conjugated dienes and aromatic olefins and copolymers of conjugated diolefins and/or aromatic olefins which have been polymerized by means of lithium based catalysts in which each polymer chain contains at least one terminal lithium group which consists essentially of reacting such polymers with a hexahalogenated cyclopentadiene whereby to effect a chain extending reaction.

2. The process of claim 1 in which the living polymer is derived from a conjugated diene.

3. The process of claim 1 in which the living polymer is a copolymer derived from a conjugated diene and an aromatic olefin.

4. The process of claim 1 in which the hexahalogenated cyclopentadiene is selected from the group consisting of 1,2,3,4,5,5-hexachlorocyclopentadiene, 1,2,3,4,5,5 - hexabromocyclopentadiene and 1,2,3,4,5,5-hexafluorocyclopentadiene.

5. The process of claim 1 in which the living polymer is derived from an aromatic olefinic monomer.

6. The process of claim 1 in which the polymerization temperature is from about 0° C. to about 100° C.

7. The process of claim 1 in which the polymerization and chain extending reaction are carried out in solution.

8. The process of claim 1 in which the living polymer is a copolymer derived from a polystyrene block polymer and a polybutadiene block polymer.

9. The process of claim 1 in which the chain extending reaction is from about 0° C. to about 50° C.

References Cited
UNITED STATES PATENTS

| | | | |
|---|---|---|---|
| 3,376,279 | 4/1968 | Buck et al. | 260—94.3 |
| 3,542,716 | 11/1970 | Muller | 260—94.2 X |
| 3,607,846 | 9/1971 | Halasa | 260—94.7 X |

JOSEPH L. SCHOFER, Primary Examiner

W. F. HAMROCK, Assistant Examiner

U.S. Cl. X.R.

260—85.1, 93.5 A, 94.7, 880 B

UNITED STATES PATENT OFFICE
CERTIFICATE OF CORRECTION

PATENT NO. : 3,813,455
DATED : May 28, 1974
INVENTOR(S) : William M. Saltman and Melvin Auerbach It is certified that error appears in the above-identified patent and that said Letters Patent are hereby corrected as shown below:

Column 3, line 21, correct spelling to -- 1,2,3,4,5,5-hexachlorocyclopentadiene --;

Column 4, line 55, change "precent" to -- percent --;

Column 4, line 57, change "with" to -- the --.

Signed and Sealed this twenty-eight Day of October 1975

[SEAL]

Attest:

RUTH C. MASON
Attesting Officer

C. MARSHALL DANN
Commissioner of Patents and Trademarks